Patented Jan. 16, 1934

1,943,943

UNITED STATES PATENT OFFICE 1,943,943

METHOD OF MAKING MALT BEVERAGES

Thomas Whittam, Brockport, N. Y.

No Drawing. Application March 16, 1931
Serial No. 523,085

4 Claims. (Cl. 195—1)

My present invention relates to a method for the manufacture of malt beverages, and it has for its object to produce a palatable beverage of this character in which the alcoholic content can be regulated and controlled, particularly for the purpose of producing a beverage having a permissible alcoholic content. A further object of the invention is to produce a method having the convenience of permitting bottling within a few hours after the batch is mixed and being suitable for human consumption within six weeks thereafter.

To these and other ends, the invention resides in certain improvements and combinations of parts, all as will be hereinafter more fully described, the novel features being pointed out in the claims at the end of the specification.

My invention contemplates control of the action of the chemical decomposition of microscopic organisms and microscopic fungus, such as vinegar or mother of vinegar, lactic acid, or culture of lactic acid bacteria, which control involves fermentation under high pressure without the presence of air and additionally the removal of sediment still without the admission of air to the beverage. A formula or mix that I have found to accomplish the desired result and produce a beer or malt beverage containing a permissible amount of alcohol consists of the following batch, for example:

5 lbs. malt extract
3 gals. of water
3 small cakes of substantially 1 oz. size commercial yeast
8 oz. of 6% acid solution of apple cider vinegar This mix is bottled within five or six hours, after standing for that length of time, and is suitable for human consumption within about six weeks, at which time it has developed a pressure of about 75 pounds, which is the pressure that the standard bottle will sustain. The control of the action of micro-organisms by pressure and the life of the beverage is strengthened under a pressure up to 200 pounds, but the higher pressure is not practicable with ordinary equipment and under ordinary conditions.

I claim as my invention:

1. A method of making a malt beverage with a permissible alcoholic content which embodies the operation of adding to a water solution of malt extract and yeast an acetic acid solution, and fermenting the mixture in a closed container.

2. A method of making a malt beverage with a permissible alcoholic content which embodies the operation of adding to a water solution of malt extract and yeast an acid solution of apple cider vinegar, and fermenting the mixture.

3. A method of making a malt beverage with a permissible alcoholic content which embodies the operation of adding to a water solution of malt extract and yeast an acid solution of apple cider vinegar in substantially the following proportions:

5 lbs. malt extract
3 gals. water
8 ounces of 6% acid solution of apple cider vinegar, and fermenting the mixture.

4. A method of making a malt beverage with a permissible alcoholic content which embodies the operation of adding to a water solution of malt extract and yeast an acid solution of apple cider vinegar and sealing the soluble elements of such mix in containers after approximately six hours exposure to the atmosphere.

THOMAS WHITTAM.